United States Patent [19]
Kitagawa et al.

[11] Patent Number: 6,139,612
[45] Date of Patent: Oct. 31, 2000

[54] ASPHALT PAVING MIX FORMED OF RECYCLED ASPHALT CONCRETE FOR PAVING AT AMBIENT TEMPERATURES AND A PROCESS FOR MAKING THE SAME

[75] Inventors: Terutaka Kitagawa; Chikao Yokokawa, both of Kyoto, Japan

[73] Assignee: Hikarigiken Co., Ltd., Kyoto, Japan

[21] Appl. No.: 09/293,045

[22] Filed: Apr. 16, 1999

[30] Foreign Application Priority Data

Apr. 28, 1998 [JP] Japan .................................. 10-156604

[51] Int. Cl.$^7$ .................................................. C09D 195/00
[52] U.S. Cl. ........................................ 106/284.1; 106/280
[58] Field of Search ................................ 106/280, 284.01

[56] References Cited

U.S. PATENT DOCUMENTS

| Re. 30,685 | 7/1981 | Mendenhall | 106/280 |
|---|---|---|---|
| 4,000,000 | 12/1976 | Mendenhall | 106/280 |
| 5,766,333 | 6/1998 | Lukens | 106/280 |

FOREIGN PATENT DOCUMENTS

| 54-21419 | 2/1979 | Japan . |
|---|---|---|
| 2-91303 | 3/1990 | Japan . |

*Primary Examiner*—David Brunsman
*Attorney, Agent, or Firm*—Christensen O'Connor Johnson & Kindness PLLC

[57] ABSTRACT

An improved asphalt mix and a process for making the same are disclosed. The asphalt mix includes aggregate grains and additive oil. The aggregate grains are obtained from crushing recycled asphalt concrete at an ambient temperature to such an extent that each aggregate grain will retain asphalt on its surface. The additive oil is preferably hydrocarbon oil having a low vapor pressure so as to be practically nonvolatile at ambient temperatures. The additive oil also has mutual solubility with asphalt at ambient temperatures. When the aggregate grains and the additive oil are mixed together at an ambient temperature, the asphalt on the surfaces of aggregate grains swells by absorbing the oil, so that the asphalt on the grains will amalgamate together when compacted at ambient temperatures to form a pavement. The asphalt concrete formed of the asphalt mix achieves sufficient strength immediately after compaction at an ambient temperature. The asphalt mix does not congeal easily and, thus, is suited for long-term storage.

20 Claims, No Drawings

ASPHALT PAVING MIX FORMED OF RECYCLED ASPHALT CONCRETE FOR PAVING AT AMBIENT TEMPERATURES AND A PROCESS FOR MAKING THE SAME

FIELD OF THE INVENTION

The present invention relates to an asphalt paving mix suitable for use at ambient temperatures and, more specifically, to an asphalt paving mix formed of recycled asphalt concrete and practically nonvolatile additive oil at an ambient temperature without any heat treatment.

BACKGROUND OF THE INVENTION

Some asphalt mixes have been proposed in the past that utilize recycled asphalt concrete and are suitable for use in paving at ambient temperatures. (See, for example, Japanese Patent Publication Serial No. 55-19268 (1980).) These asphalt mixes are formed by crushing recycled asphalt concrete into aggregate grains to such an extent that each aggregate grain will still retain asphalt on its surface; adding to the aggregate grains an appropriate amount of volatile oil, such as kerosene and light oil, and an appropriate amount of additives including both asphalt emulsion and liquid rubber, at an ambient temperature; and mixing them together. Thus, these asphalt mixes are based on the technical concept that, while these mixes would not congeal within a sealed container, once they are exposed to ambient air at a paving site, volatile oil evaporates to allow asphalt to congeal and harden to form a pavement.

These asphalt mixes are advantageous in that they may be formed without heat treatment during the adding and mixing of the additives to the aggregate grains, as described above, and also in that they may be applied easily at an ambient temperature to form a pavement. However, because the additives include liquid rubber, these mixes cannot harden immediately after their application at a paving site and, rather, take a considerable amount of time, often as long as a few months, before achieving a desired hardness. This presents a further disadvantage that the resulting pavement may be cracked or otherwise damaged prematurely before it achieves sufficient hardness and strength.

To achieve a sufficiently hard pavement surface immediately after paving, the amount of volatile oil to be added to the aggregate grains may be reduced, so as to allow the asphalt to congeal more easily. This, however, makes it almost impossible to store the asphalt mixes, since volatile oil tends to evaporate over time to cause the mixes to congeal and lump together. Lumped and solidified mixes thus become unusable later on, when they are to be applied to form a pavement.

Some other asphalt mixes have been also proposed in the past, which include a special additive (chemical substance) to cause a polycondensation reaction, so as to increase the hardness of the resulting asphalt pavement after it is solidified. (See, for example, Japanese Patent Publications Serial Nos. 63-137959 (1988) and 2-228363 (1990).) Production of such special additives, however, is extremely cumbersome and expensive, and the strength of the resulting asphalt pavement cannot be expected to improve substantially.

A need exists for an improved asphalt mix, which does not require heat treatment during its production process, and may be applied to form or repair a pavement at an ambient temperature, which can be stored for a long time, and is capable of achieving sufficient strength and stability immediately after its application at a paving site. Such asphalt mix preferably does not require a special additive formed of expensive chemical substance.

SUMMARY OF THE INVENTION

The present invention provides an improved asphalt mix and a process for making the same, which overcome all of the disadvantages associated with the prior art asphalt mixes as described above. The asphalt mix includes aggregate grains and additive oil. The aggregate grains are obtained from crushing recycled asphalt concrete at an ambient temperature to such an extent that each aggregate grain will retain asphalt on its surface. The additive oil is preferably hydrocarbon oil, has a low vapor pressure so as to be practically nonvolatile at ambient temperatures, and also has mutual solubility with asphalt at ambient temperatures. When the aggregate grains and the additive oil are mixed together at an ambient temperature, the asphalt on the surfaces of aggregate grains swells by absorbing the oil to such an extent that, when the asphalt mix is firmly compacted at ambient temperatures, the asphalt on each of the aggregate grains will amalgamate together to form a stable paving surface.

Thus, the asphalt mix of the present invention does not require any heat treatment during its forming process, is suitable for application at ambient temperatures, and achieves sufficient strength immediately after its paving application at an ambient temperature. The asphalt mix does not amalgamate easily, so it is well suited for long-term storage.

DETAILED DESCRIPTION OF THE PREFERRED EMBODIMENT

The present invention provides an improved asphalt mix. The mix includes aggregate grains obtained from crushing recycled asphalt concrete at an ambient temperature to such an extent that each aggregate grain will retain asphalt on its surface. The mix also includes additive oil having a low vapor pressure so as to be practically nonvolatile at ambient temperatures. The additive oil has mutual solubility with asphalt at ambient temperatures. When the aggregate grains and the additive oil are mixed together at an ambient temperature, the asphalt on the surfaces of aggregate grains swell by absorbing the oil, so that when the asphalt mix is compacted the asphalt on the grains will amalgamate together to instantly form a stable paving surface.

The aggregate grains are obtained by crushing recycled asphalt concrete, wherein each grain is sized sufficient to retain some asphalt on its surface. Because the asphalt on these recycled aggregate grains is typically aged by weathering, it is stiffer than virgin asphalt. When a prescribed amount of the oil is added at ambient temperatures, the stiffened asphalt swells. When the asphalt mix comprising the aggregate grains covered with thus swollen asphalt is compacted at an ambient temperature, an adequately hard and stable paving surface is achieved instantly.

The additive oil to be mixed with the aggregate grains at ambient temperatures has a mutual solubility with asphalt at an ambient temperature, so that aged, weathered asphalt covering the surfaces of the grains can be swollen gradually. Further, the additive oil is practically nonvolatile at ambient temperatures so that the swollen state of the asphalt can be maintained for a long period, without causing the asphalt on the grains to congeal together. Preferably, the additive oil has a flashpoint of 200° C. or higher.

The swelling of the asphalt on the grain surfaces should be sufficient to allow the swollen asphalt on each grain surface to intermingle with, and adhere to the swollen asphalt on adjacent grain surfaces when the asphalt mix is firmly compacted. Thus, when the asphalt mix comprising the asphalt swollen with additive oil is applied on a roadbed and is compacted by rolling or vibration at ambient temperatures, the aggregate grains compact themselves together, eliminating any space therebetween and further deforming and bonding together the swollen asphalt on the grain surfaces. Thus, the swollen asphalt functions as a binder to bond the aggregate grains firmly together, to create a paving surface having sufficient hardness immediately after the completion of paving.

The additive oils suitable for use in the present invention include petroleum hydrocarbons, animal/plant oils and fats, synthetic hydrocarbons, and synthetic esters. However, animal/plant oils and fats may not be preferable since they are subject to various adverse reactions and also tend to deteriorate easily. Also, synthetic hydrocarbons and esters may not be preferable since they are both relatively expensive. Thus, petroleum hydrocarbons are preferable. Further preferably, heavy hydrocarbon oil having a flashpoint higher than approximately 200° C. is suitable for use.

To achieve uniform mixing of the aggregate grains and the additive oil, it may be preferable to use additive oil having a lower viscosity. On the other hand, to achieve a strong paving surface, it may be preferable to use additive oil having a higher viscosity. The viscosity of the additive oil also affects the degree of asphalt swelling. Considering all these factors, it has been found that additive oil having a kinematic viscosity of between approximately 40 and 150 (cSt. at 40° C.) is preferable for use in accordance with the present invention. It has also been found that the kinematic viscosity in the range between approximately 90 and 110 (cSt. at 40° C.) appears to be optimum.

The amount of additive oil to be added is determined based on the amount of asphalt retained on the surfaces of the aggregate grains, which are obtained from crushing recycled asphalt concrete. When too much additive oil is used relative to the amount of asphalt on the grains, the asphalt will swell and soften excessively, thereby reducing the mutual cohesiveness between aggregate grains and, thus, weakening the strength of a resulting pavement. If too little additive oil is added, the asphalt will not swell sufficiently, thereby also preventing adequate bonding between the aggregate grains even after firm compaction. Accordingly, it has been found that a preferable ratio of the additive oil to the asphalt retained on the grains is between approximately 0.24 and 0.34 by weight.

It has been found that aggregate grains sized to pass through a 13 mm sieve, which is a standard grain size as prescribed by the Japanese Highway Association Corporation, work well in the present invention. As a matter of convenience in accordance with the Japanese standard for the purpose of the present discussion, it may be practical to categorize the aggregate grain sizes into three groups by sieving: grains remaining on a 13 mm sieve; grains passing through a 13 mm sieve but remaining on a 0.6 mm sieve; and grains passing through a 0.6 mm sieve. The asphalt content (% in weight) of the aggregate grains, obtained from crushing recycled asphalt concrete, depends on the grain size, and smaller grains typically have a larger content of asphalt (% in weight), and vice versa.

The performance or quality of the asphalt mix of the present invention depends on the amount of asphalt included within the mix. If there is too little asphalt, the mix will produce an asphalt concrete with insufficient strength, which easily crumbles or cracks. On the other hand, if too much asphalt is included in the mix, the resulting asphalt concrete will not have sufficient strength due to excessive plasticity. Therefore, the amount of asphalt to be included in the mix should be determined based on the desired performance quality of the asphalt mix. Preferably, asphalt of approximately 4 to 6% by weight of the total weight of the asphalt mix is used. To achieve such preferable ratio, one may selectively mix aggregate grains that can pass through a 13 mm sieve but cannot pass through a 0.6 mm, and aggregate grains that can pass through a 0.6 mm sieve. If preferable, color additives such as carbon black of approximately 0.01 to 0.1% by weight of the total mix weight may be added for coloring purposes.

During mixing, optionally, calcium carbonate ($CaCO_3$) powder may be added as a filler. Calcium carbonate is believed to increase the strength of resulting asphalt concrete after compaction and, also, to help prevent solidification of asphalt mix during storage. The amount of calcium carbonate powder to be added is preferably between approximately 1.0 and 6.0% by weight, and further preferably between approximately 3.0 and 5.5% by weight, of the total weight of the asphalt mix.

The present invention also provides a process of forming the asphalt mix of the present invention as described above, which takes place entirely at ambient temperatures without involving any heat treatment. Specifically, the process first crushes recycled asphalt concrete into aggregate grains at an ambient temperature, to such an extent that each aggregate grain will be sized so as to retain asphalt on its surface. The process then adds a prescribed amount of additive oil to the aggregate grains, wherein the oil has a low vapor pressure so as to be practically nonvolatile at ambient temperatures and also has mutual solubility with asphalt at ambient temperatures. The process thereafter mixes the aggregate grains and the oil at an ambient temperature to swell the asphalt on the surfaces of the aggregate grains, so as to allow the asphalt to amalgamate together when compacted at an ambient temperature to form a pavement.

It should be noted that the present process is an entirely cold process, including the steps of providing aggregate grains at an ambient temperature; adding thereto additive oil at an ambient temperature; and mixing the aggregate grains and the oil at an ambient temperature. Because the present process does not require any heat treatment, it generally reduces production costs of the asphalt mix.

Application of the asphalt mix produced in accordance with the present invention at a paving site includes preparing the asphalt mix of the present invention, applying the asphalt mix on a surface to be paved at ambient temperatures, and compacting the asphalt mix at ambient temperatures. The compaction may be performed by rolling, vibration, or using any other suitable means to apply pressure. Optionally, asphalt emulsion may be applied on the surface to be paved, prior to application of the asphalt mix thereto, so as to function as a glue between the surface and the asphalt mix.

As hereinbefore described, the present invention provides an improved asphalt mix for paving at ambient temperatures, the process of making such mix requiring no heat treatment. Because the aggregate grains are mixed with a small amount of additive oil at ambient temperatures without involving any heat treatment, the process of producing the mix of the present invention saves thermal energy consumption. Furthermore, because the major portion (more than 90% by weight) of materials used to form the mix is supplied by crushing and sieving recycled asphalt concrete, the present invention saves natural resources. Even further, the present asphalt mix is environmentally friendly, since the additive oil used has a very low vapor pressure to be practically nonvolatile at ambient temperatures and, thus, the only volatile matter that may evaporate after application of the mix at a paving site will be practically none other than moisture. The asphalt mix of the present invention is suitable for forming asphalt concrete, which obtains sufficient stability instantly after compaction at ambient temperatures and, also, is suitable for long-term storage.

EXAMPLE

Large lumps of recycled asphalt concrete were crushed into midsized blocks (less than 1000 mm in diameter), and were further reduced in size, using an impeller breaker, into grains that mostly passed a 13 mm sieve. The grains are then divided by sieving into three fractions: (1) grains remaining on a 13 mm sieve; (2) a coarse fraction (grains passing through a 13 mm sieve but remaining on a 0.6 mm sieve); and (3) a fine fraction (grains passing through a 0.6 mm sieve). The coarse fraction was predominant in the obtained aggregate grains, and its asphalt content was approximately 4.2 to 4.8% by weight of the total weight of the grains of the fraction.

By selectively mixing the coarse fraction grains with the fine fraction grains, four types of aggregate grains, which contained 6.5, 6.2, 5.6, and 4.8% of asphalt by weight, were prepared and labeled as Samples A through D, respectively. One ton of each of Samples A through D was introduced individually into a batch-type mixer of 1 ton capacity, and was agitated vigorously, while spraying a prescribed amount of additive oil at ambient temperatures.

During mixing, calcium carbonate ($CaCO_3$) powder was optionally added as a filler.

Table 1 shows the detailed composition of the prepared eight asphalt mixes. The Marshall stability test (ASTM D 1559-71) was performed on respective pavement specimens created with Samples A through D, and the results are shown in Table 1. One kilogram of each sample mix was rammed 50 times from one end, inverted, and again rammed 50 times from the other end in a specified cup, as prescribed in the Marshall stability test. The stability of the resulting test piece was then measured. According to the Marshall stability test, the test piece should be kept at 60° C. before measuring stability. However, since the asphalt mix formed in accordance with the present invention does not require any heat treatment and, rather, is prepared entirely at ambient temperatures, the eight specimens shown in Table 1 were rammed at ambient temperatures immediately after the asphalt mixes were produced, and their stability was then measured also at ambient temperatures.

In Table 1, the amount of the aggregate grains, calcium carbonate ($CaCO_3$), additive oil, and asphalt retained on the surfaces of the aggregate grains, are shown in percent by weight of the produced asphalt mix. The weight of asphalt is calculated in both the "Asphalt Contained" and "Aggregate Grains" columns, since the weight of aggregate grains includes the weight of asphalt. In the column of additive oil, "P" stands for petroleum hydrocarbon and "O" stands for plant oil. The value shown in the column indicates its kinematic viscosity in cSt, at 40° C. The mixing rate of oil to asphalt signifies a value calculated by dividing the amount of additive oil by the amount of asphalt in the mix. The stability value in the table signifies a stability level in $kg/cm^2$. "Rammed" means that the test piece was made by ramming, as in the Marhall stability test described above, and "core" means that the test piece was a core piece (63 mm thick and 100 mm in diameter), which was cut from an actual asphalt pavement constructed with the eight asphalt mixes. The detailed results are shown in Table 1.

TABLE 1

| Specimen No. | Aggregate Grains Sample | Quantity (%) | $CaCO_3$ added (%) | Additive Oil Quantity (%) | Additive Oil Quality cSt 40° C. | Asphalt Contained (%) | Oil-to-asphalt ratio | Stability ($kg/cm^2$) Rammed | Stability ($kg/cm^2$) Core |
|---|---|---|---|---|---|---|---|---|---|
| 1 | A | 92.5 | 5.5 | 2.0 | P 98 | 6.0 | 0.33 | 890 | 910 |
| 2 | B | 93.0 | 5.5 | 1.5 | P 98 | 5.8 | 0.26 | 620 | 630 |
| 3 | B | 93.0 | 5.5 | 1.5 | P 40 | 5.8 | 0.26 | 565 | 555 |
| 4 | B | 93.0 | 5.5 | 1.5 | O 40 | 5.8 | 0.26 | 541 | 500 |
| 5 | B | 95.0 | 3.0 | 2.0 | P 98 | 5.9 | 0.34 | 540 | 540 |
| 6 | B | 98.0 | 0 | 2.0 | P 150 | 6.1 | 0.33 | 530 | 530 |
| 7 | C | 98.7 | 0 | 1.3 | P 98 | 5.5 | 0.24 | 502 | 480 |
| 8 | D | 98.5 | 0 | 1.5 | P 98 | 4.7 | 0.32 | 450 | 430 |

Table 1 shows that a stability level of as high as 530 $kg/cm^2$ (see No. 6) was achieved, even without addition of calcium carbonate ($CaCO_3$). Such stability level is sufficient to form a permanent pavement. The test specimens Nos. 7 and 8, which provide somewhat less stability level, appear to be still effective for forming a provisional pavement. Test specimen No. 1, which comprises 6.0% asphalt, 2.0% additive oil, and 5.5% $CaCO_3$, all by weight, shows a stability level of 890 $kg/cm^2$. The results in Table 1, thus, indicate that the asphalt mix of the present invention, formed at ambient temperatures without any heat treatment, produces sufficiently strong and stable pavements.

For comparison purposes, the Marshall stability test was also conducted for asphalt concrete constructed from various prior art asphalt mixes comprising volatile oil and liquid rubber, which all indicated a stability level of approximately 100 $kg/cm^2$. In addition, some other commercially available prior art asphalt mixes have been tested using the Marshall stability test, all of which were formed using heat treatment and some of which included special additives (chemical substances having polymerization and/or condensation tendency). The Marshall stability levels were found to be 422, 370, and 350 $kg/cm^2$, respectively, for the mixes tested. Judging from these results, it appears that the prior art asphalt mixes are not suited for forming stable permanent pavements, though they may suffice for forming provisional pavements.

The asphalt mixes produced in accordance with the present invention in Table 1 were used to pave an actual road that experiences daily, heavy traffic. In application, a small amount of asphalt emulsion was applied on the surface of the roadbed prior to application of the asphalt mixes, to create a thin asphalt coating that effectively acts as a glue between the roadbed and the asphalt mix. Using only a manual vibroplate rammer, the asphalt mix was pressed on the roadbed to a thickness of approximately 65 mm. Five days after the paving, several core pieces (63 mm thick and 100 mm in diameter) were cut out from the pavement, and their Marshall stability levels were measured.

The results are shown in the "Core" column in Table 1. As these results demonstrate, the test pieces cut out from the road only five days after the paving had stability levels equivalent to or exceeding the stability levels of those test pieces compacted by ramming as specified in the Marshall stability test (see the "Rammed" column). The results indicate that the asphalt paving mixes formed in accordance with the present invention are well suited for forming stable pavements at ordinary temperatures. Generally, paving with larger sized rollers significantly increases the stability of the asphalt concrete and, thus, the stability level of the asphalt concrete of the present invention is expected to increase as larger sized rollers are used to form pavements.

To test the storage characteristics of the asphalt mix produced in accordance with the present invention, 30 kg each of freshly produced asphalt mix, Specimens Nos. 1–8, were packed in a paper sack, and the sacks were stacked into five-sack piles and sat at a room temperature for three months. Although the asphalt mixes packed in these sacks seemed a little lumpy after three months, the lumps were quickly broken up by pounding lightly the outside of the sacks, and usable asphalt mixes were poured out easily. The asphalt mixes produced in accordance with the present invention and kept in sacks for three months showed stability levels equivalent to those demonstrated by newly prepared mixes. For comparison purposes, when other commercially available asphalt mixes were tested for their storage characteristics, most of them became extremely lumpy and solidified within two months, and could not be poured out of their sacks.

While the preferred embodiments of the present invention have been illustrated and described, it will be appreciated that various changes can be made therein without departing from the spirit and scope of the invention.

The embodiments of the invention in which an exclusive property or privilege is claimed are defined as follows:

1. An asphalt mix suitable for forming a paving surface at an ambient temperature, comprising:
   aggregate grains obtained from crushing recycled asphalt concrete at an ambient temperature, each aggregate grain being sized so as to retain asphalt on its surface, and
   additive oil having a low vapor pressure so as to be practically nonvolatile at ambient temperatures, the oil having mutual solubility with asphalt at ambient temperatures;
   wherein the asphalt retained on the surfaces of the aggregate grains is swollen with the additive oil so as to amalgamate when the aggregate grains are compacted at an ambient temperature.

2. The asphalt mix of claim 1, wherein the additive oil is selected from the group consisting of petroleum hydrocarbons, animal/plant oils and fats, synthetic hydrocarbons, and synthetic esters.

3. The asphalt mix of claim 2, wherein the additive oil is heavy hydrocarbon oil having a flashpoint higher than approximately 200° C.

4. The asphalt mix of claim 1, wherein the additive oil has a kinematic viscosity ranging between approximately 40 and 150 (cSt. at 40° C.).

5. The asphalt mix of claim 4, wherein the additive oil has a kinematic viscosity ranging between approximately 90 and 110 (cSt. at 40° C.).

6. The asphalt mix of claim 1, wherein the additive oil has a flashpoint higher than approximately 200° C.

7. The asphalt mix of claim 1, wherein the ratio of the additive oil to the asphalt retained on the surfaces of the aggregate grains is between approximately 0.24 and 0.34 by weight.

8. The asphalt mix of claim 1, wherein the aggregate grains can pass through a 13 mm sieve.

9. The asphalt mix of claim 1, wherein the asphalt retained on the surfaces of the aggregate grains comprises between approximately 4 and 6% by weight of the total weight of the asphalt mix.

10. The asphalt mix of claim 1, further comprising calcium carbonate powder of between approximately 1.0 and 6.0% by weight of the total weight of the asphalt mix.

11. The asphalt mix of claim 10, wherein the calcium carbonate powder comprises between approximately 3.0 and 5.5% by weight of the total weight of the asphalt mix.

12. A process for making an asphalt mix suitable for forming a pavement surface at an ambient temperature, comprising:
   crushing recycled asphalt concrete into aggregate grains at an ambient temperature, each aggregate grain being sized so as to retain asphalt on its surface;
   adding a prescribed amount of additive oil to the aggregate grains, the oil having a low vapor pressure so as to be practically nonvolatile at ambient temperatures, the oil also having mutual solubility with asphalt at ambient temperatures;
   mixing the aggregate grains and the oil at an ambient temperature; and
   swelling the asphalt on the surfaces of the aggregate grains with the oil so as to allow the asphalt to amalgamate together when compacted at an ambient temperature.

13. The process of claim 12, wherein the additive oil is selected from the group consisting of petroleum hydrocarbons, animal/plant oils and fats, synthetic hydrocarbons, and synthetic esters.

14. The process of claim 13, wherein the additive oil is heavy hydrocarbon oil having a flashpoint higher than approximately 200° C.

15. The process of claim 12, wherein the additive oil has a kinematic viscosity ranging between approximately 40 and 150 (cSt. at 40° C.).

16. The process of claim 15, wherein the additive oil has a kinematic viscosity ranging between approximately 90 and 110 (cSt. at 40° C.).

17. The process of claim 12, wherein the additive oil has a flashpoint higher than approximately 200° C.

18. The process of claim 12, wherein the ratio of the additive oil to the asphalt retained on the surfaces of the aggregate grains is between approximately 0.24 and 0.34 by weight.

19. The process of claim 12, wherein the aggregate grains can pass through a 13 mm sieve.

20. The process of claim 12, wherein the asphalt retained on the surfaces of the aggregate grains comprises between approximately 4 and 6% by weight of the total weight of the final asphalt mix.

* * * * *